3,257,473
PROCESS FOR SEPARATING C₄ TO C₁₂ NON-TERTIARY OLEFINS FROM TERTIARY OLEFINS WITH FLUORINE SUPPORTED ON ALUMINA
Stephen M. Kovach, Highland, Ind., assignor to Sinclair Research, Inc., Wilmington, Del., a corporation of Delaware
No Drawing. Filed Dec. 20, 1962, Ser. No. 245,957
7 Claims. (Cl. 260—677)

This invention relates to a process for the separation of primary and/or secondary monoolefins from a hydrocarbon stream containing these monoolefins and the corresponding tertiary or branched olefins of approximately the same boiling range. Specifically, the present invention relates to the selective separation of primary and secondary aliphatic monoolefin hydrocarbons from aliphatic tertiary monoolefin hydrocarbons, containing about 4 to 12, preferably 4 to 7, carbon atoms over defined catalysts while using particular processing conditions.

The separation of non-tertiary olefins from tertiary olefins is of vital interest to the petrochemical industry. The process of the present invention provides a method of preparing substantially pure primary and secondary monoolefins, such as for instance, neo-olefins, i.e. olefins having a neo carbon atom and the unsaturation occurring in the terminal position of the carbon chain, e.g. 3,3-dimethyl butene-1, by the selective polymerization of the branched olefin admixed with the other olefins. Neo-acids and neo-alcohols have recently aroused much interest as components of synthetic lubricants having improved oxidation resistance and high temperature properties.

Alternatively, the present invention provides a method wherein tertiary olefins are separated from the mixed olefinic hydrocarbon stream by polymerization of the tertiary olefin and a high purity tertiary olefin can be obtained by depolymerization of the polymerized tertiary olefin. Tertiary olefins, such as for instance, isobutene, branched amylenes, branched hexenes and branched heptenes are of current interest as raw materials for the synthesis of neo-acids and neo-alcohols. Tertiary olefins also are used in preparing alkylated phenols, such as tertiarybutyl phenol for use in modified phenol-formaldehyde resins. Branched amylenes, for example, are of importance as raw materials for the manufacture of isoprene, which is in turn used as a source of "synthetic natural" rubber. 3-methyl-1-butene which can be made from 2-methyl-2-butene or 2-methyl-1-butene, is of interest as a monomer for the preparation of polymers. Isobutylene of high purity is desired for the manufacture of butyl rubber.

Neoolefins, such as neohexenes and neoheptenes, can be obtained through the condensation of t-butyl chloride with ethylene or propylene and dehydrochlorinating the resulting product to yield a crude product of neohexene or neoheptene containing unconverted halide plus mono and branched diolefins. In the purification of neohexenes several fractionation towers are required to split the branched amylenes and isoprene from neohexene. Also, chemical treating such as low temperature acid extraction is required for removal of traces of isoprene-branched amylenes in the neohexenes by polymerization. However, the acid strength of the solid or liquid catalyst or the process conditions required to obtain conversion of the mono and branched diolefins readily converts the neohexene through isomerization to 2,3-dimethylbutenes. At conditions where isomerization is negligible, the catalysts are inactive towards polymerization of the tertiary olefins. Dilute sulfuric acid can be utilized for absorption of the monoisoolefins, but separation, washing, and corrosion problems are inherent with this separation technique. Likewise, tertiary olefins are needed in high purity for the production of polymers, alcohols, diolefins, etc. They may be extracted from mixed streams by fractionation, sulfuric acid extraction and azeotropic distillation, but these are costly means of separation. Fractionation is made difficult by close boiling isomers and acid extraction may lead to dimerization and co-dimerization.

The present invention presents a process for the selective polymerization of tertiary olefins in a mixture with primary and/or secondary monoolefins over a select catalyst containing fluorine and alumina while employing a particular set of operating conditions. Tertiary olefins are distinguished from non-tertiary olefins by having a tertiary carbon atom, that is, a carbon attached to three additional carbon atoms, with one of the three additional carbon atoms being the other carbon atom in the olefinic group. Non-tertiary olefins include primary, i.e. terminal olefins, and secondary olefins where each carbon atom of the olefinic group is attached to one other carbon atom. High conversions of the isoolefin to dimer, trimer, tetramer, pentamer, etc. is obtained with little or no primary monoolefin conversion and relatively little secondary monoolefin reaction. If any branched diolefins are present, they will be polymerized whether they are conjugated or not. To obtain the desired results, it is important that the conditions of temperature and pressure employed in the process be such that the olefin remains essentially in the liquid phase. This necessitates maintaining processing temperatures below the critical temperature of the branched olefin and operating at pressures above the vapor pressure of the tertiary olefin at the processing temperature under essentially anhydrous conditions. Under these processing conditions carbon double bond and skeletal isomerization are substantially eliminated. In the polymerization convenient reaction temperatures are below about 200° F., for instance about —100 to 197° F., preferably about —80 to 150° F. for propylene and the pressure often ranges from about 0 to 2000 p.s.i.g., preferably about atmospheric to 800 p.s.i.g. Space velocities in the range of about 0.1 to 20 LHSV (liquid hourly space velocity) have been found suitable but a space velocity of about 0.1 to 10 LHSV is preferred. When using a fluorine-alumina catalyst, the principal products are the trimers, tetramers and pentamers of the tertiary olefin component of the feed. The polymer fraction can be separated from the unreacted olefins by any suitable means such as fractionation. The hydrocarbon stream can contain from about 10 to about 75% tertiary olefin based on the total olefin content of the feed.

Due to the exothermicity of the polymerization reaction and the narrow temperature operating range, it is preferred to employ internal means as heat sinks. This can be accomplished for instance by employing inert hydrocarbon and catalyst diluents. The catalyst diluents are solid and the hydrocarbon diluents are liquid at the reaction conditions. The hydrocarbon diluent can be any hydrocarbon, unable to undergo polymerization, condensation, alkylation or other reaction under the process conditions. This would encompass paraffins, naphthenes, etc. The non-aromatics are preferred and the especially preferred inert hydrocarbon diluent is propane. The inert hydrocarbon diluent reduces the concentration of olefin in the liquid phase and at the catalyst surface and often acts as a heat sink. If aromatics are used as a diluent, benzene, toluene, xylene and other mono and (di-substituted) aromatics are undesirable since they may undergo alkylation with the olefin under the mild reaction conditions for selective polymerization. The aromatic solvent should be non-alkylatable under the conditions utilized, i.e. they should be highly substituted as for instance tetra or higher substituted benzenes. The choice of solvent will depend on factors such as the olefin feed, etc. which tend to maximize polymerization and minimize alkylation. Suitable inert catalyst diluents are any materials not supporting the polymerization, e.g. tabular alumina nor which would destroy the polymerization activity of the catalyst. The amount of liquid diluent may be present in the range of about 0 to about 10 or more, preferably about 0.5 to 2 volumes of diluent to about 1 volume of the olefin. The solid diluent may be present in a volume ratio of about 0 to about 10, preferably about 1 to 3 volumes of the solid diluent to about 1 volume of the catalyst. In addition, external sources of cooling may be utilized such as circulating cold water, cold feed, air, etc.

The catalyst of the present invention is an alumina base catalyst containing fluorine. The fluorine can be present in the catalyst in the form of the ion, per se or in combinations such as a metal fluoride e.g. zinc or aluminum fluoride, fluosilicic acid, or fluoborate. The fluorine promoter is present on the alumina support in catalytically effective amounts. Generally this amount will fall within the range of about 1 to 20% by weight, preferably about 3 to 15% by weight. The catalyst support of the present invention is an activated or a gamma family alumina, e.g. gamma, eta, etc., such as those derived by calcination of amorphous hydrous alumina, alumina monohydrate, alumina trihydrate or their mixtures. The catalyst base most advantageous is derived from a mixture predominating, for instance, in about 65 to 95 weight percent, in one or more of the alumina trihydrates, i.e. bayerite I, randomite (nordstrandite), or gibbsite and also having about 5 to 35 weight percent of alumina monohydrate (boehmite), amorphous hydrous alumina or their mixture. The alumina support can contain small amounts of other materials e.g. solid oxides such as silica, magnesia, activated clays, titania, zirconia, etc. or their mixtures.

The catalysts can be prepared for instance by impregnation using a water-soluble inorganic compound of the catalytic component or by precipitation methods well known to the art. The fluorine can be added to the catalyst base in any stage of its preparation, for instance before or after it has been formed by tabletting or extrusion and calcined. After fluorine addition the catalyst can be calcined. In the case of fluoride alumina, the fluorine is commonly added through the use of a water-soluble fluoride compound. Although ammonium fluoride is generally preferred other water-soluble fluoride compounds, for example ammonium fluosilicate, ammonium fluoborate, fluosilicic acid, hydrofluoric acid and the like can be employed.

To further illustrate the process of the present invention the following example is included.

EXAMPLE I

A pentene feed high in tertiary branched amylenes, representative of that available at a refinery and used in acid extraction processes for isoamylene production, was processed over a zinc fluoride and alumina catalyst in the liquid phase. The processing conditions and results obtained are presented in Table I.

Table I

| | Run No. | | |
|---|---|---|---|
| | 1 | 2 | 3 |
| Catalyst | 12% $ZnF_2$ on $Al_2O_3$ | | $SiO_2 \cdot Al_2O_3$ |
| Feed | 41% t-i-$C_5^{=1}$ 24% n-$C_5^{=2}$ 35% i-$C_5^{=3}$ | | 16% t-i-$C_5^=$ 84% n-$C_5^=$ |
| Conditions: | | | |
| Temperature, °F | 0 | −50 | 200 |
| Pressure, p.s.i.g | Atm. | Atm. | Atm. |
| LHSV | Batch | Batch | 0.5 |
| G. Feed/g. Cat | 1.7/1 | 3.5/1 | 0.5 |
| Wt. percent Polymerization: | | | |
| Total Olefin Poly | 73 | 50 | 17 |
| i-$C_5^=$ | 86 | 61 | 42 |
| n-$C_5^=$ | 50 | 24 | 12 |
| G. i-$C_5^=$/g. n-$C_5^=$ | 3/1 | 4/1 | 1/1.5 |

[1] A mixture of 2 methyl butene-1 and 2 methyl buotene-2.
[2] A mixture of primary and secondary monolefins.
[3] Essentially tertiary pentanes.

Very little, if any, double bond and skeletal isomerization occurred in runs 1 and 2. Run 3, employing a $SiO_2 \cdot Al_2O_3$ catalyst, is presented to emphasize the superiority of the catalyst and processing conditions of the present invention in regard to conversion and selectivity. The branched amylene dimer can be utilized as gasoline or converted back to the isoamylene monomer by dedimerization, for instance by contacting the dimer at above room temperatures with acid catalysts.

The catalyst of the present invention possesses unique fouling and regenerating features. By operating at low temperatures (at room temperature) this catalyst becomes deactivated not by carbon laydown on catalyst but loses activity by the plugging of the catalyst pores by heavy polymeric material. Polymerization activity can be restored, however, by washing the catalyst with a suitable paraffin or aromatic hydrocarbon solvent as, for instance, n-pentane or benzene. If solvent washing fails, reactivation can be brought about by heat-treating the catalyst to 400 to 700° F. and purging with an inert gas such as nitrogen. This high temperature purge drives the heavy polymeric material out of the pores of the catalyst depositing only a small amount of carbon on the catalyst without loss in polymerization activity. In addition, catalyst reactivation can be accomplished by employing a hydrogenation metal component on the catalyst, e.g., a platinum group or iron-group metal, and hydrogenating the adsorbed polymer to a paraffin which is readily desorbed.

It is claimed:
1. A process for the selective separation of $C_4$ to $C_{12}$ non-tertiary monoolefin hydrocarbons from admixture with tertiary monoolefin hydrocarbons of approximately the same boiling range which consists essentially of contacting a mixture of said non-tertiary monoolefin hydrocarbons and said tertiary monoolefin hydrocarbons in the liquid phase with a catalyst consisting essentially of a catalytic amount of fluorine supported on activated alumina at a contact temperature and pressure sufficient to maintain said mixture essentially in the liquid phase, said temperature being from about −100 to 200° F. and said pressure being from about 0 to 2000 p.s.i.g., to selectively polymerize said tertiary olefin, and thereafter separating the polymerized tertiary olefin from the resulting polymerization product.

2. The process of claim 1 wherein the contact temperature is about −80 to 150° F. and the contact pressure is about atmospheric to 800 p.s.i.g. and the primary monoolefin is pentene.

3. The method of claim 2 wherein the amount of fluorine on the alumina is about 3 to 15% by weight.

4. The method of claim 1 wherein the fluorine is supplied by zinc fluoride.

5. The process of claim 1 wherein the space velocity is from about 0.1 to 20 LHSV.

6. The process of claim 2 wherein the space velocity is about 0.1 to 10 LHSV.

7. A process for the purification of a crude pentene fraction containing as an impurity tertiary amylenes which consists essentially of contacting said crude fraction in the liquid phase with a catalyst consisting essentially of a catalytic amount of fluorine supported on activated alumina at a contact temperature of from about −100 to 200° F., contact pressure of from about 0 to 2000 p.s.i.g. and space velocity of from about 0.1 to 20 LHSV to selectively polymerize said tertiary amylene said temperature and pressure being effective to maintain said fraction in essentially the liquid phase, and thereafter separating pentene from the polymerization product.

References Cited by the Examiner

UNITED STATES PATENTS

| | | | |
|---|---|---|---|
| 2,007,160 | 7/1935 | Engs et al. | 260—677 |
| 2,342,074 | 2/1944 | Deanesly et al. | 260—677 |
| 2,406,869 | 9/1946 | Upham | 260—683.15 |
| 2,414,760 | 1/1947 | Mottern | 260—677 |
| 2,487,978 | 11/1949 | Murray | 260—683.15 |
| 2,552,692 | 5/1951 | Schulze et al. | 260—677 |

OTHER REFERENCES

Oblad et al.: "Industrial and Engr. Chem.," vol. 39, 1947, pages 1462–1466.

ALPHONSO D. SULLIVAN, *Primary Examiner.*

D. S. ABRAMS, *Assistant Examiner.*